US000001013H

United States Statutory Invention Registration [19]

[11] Reg. Number: H1013

Wormsbecher et al.

[43] Published: Jan. 7, 1992

[54] PROCESS FOR THE IMMOBILIZATION AND VOLUME REDUCTION OF LOW LEVEL RADIOACTIVE WASTES FROM THORIUM AND URANIUM PROCESSING

[75] Inventors: Richard F. Wormsbecher, Highland, Md.; Alan T. Chapman, Jr., Atlanta; David N. Hill, Chamblee, both of Ga.

[73] Assignee: W. R. Grace & Co.-Conn., New York, N.Y.

[21] Appl. No.: 392,327

[22] Filed: Aug. 11, 1989

[51] Int. Cl.[5] ..... G21F 9/16

[52] U.S. Cl. ..... 252/629; 252/628; 252/633; 252/632

[58] Field of Search ..... 252/629, 633, 632, 628

[56] References Cited

U.S. PATENT DOCUMENTS

| | | | |
|---|---|---|---|
| 4,020,004 | 4/1977 | Schulz et al. | 252/629 |
| 4,312,774 | 1/1982 | Macedo et al. | 252/629 |
| 4,354,954 | 10/1982 | Köster et al. | 252/629 |
| 4,376,070 | 3/1983 | Pope et al. | 252/629 |
| 4,382,974 | 5/1983 | Yannopoulos | 427/5 |
| 4,395,367 | 7/1983 | Ruhrmann et al. | 252/629 |
| 4,422,965 | 12/1983 | Chickering et al. | 252/629 |
| 4,514,329 | 4/1985 | Wakabayashi et al. | 252/629 |
| 4,528,011 | 7/1985 | Macedo et al. | 65/30.13 |
| 4,534,893 | 8/1985 | Dippel et al. | 252/629 |
| 4,626,382 | 12/1986 | Stritzke et al. | 252/629 |
| 4,661,291 | 4/1987 | Yamasaki et al. | 252/629 |
| 4,725,383 | 2/1988 | Hayashi et al. | 252/629 |

OTHER PUBLICATIONS

Bruce et al., Progress in Nuclear Energy, 1958, p. 443–455.

*Primary Examiner*—Brooks H. Hunt
*Assistant Examiner*—Ngoclan T. Mai
*Attorney, Agent, or Firm*—Arthur P. Savage

[57] ABSTRACT

A process for the immobilization and volume reduction of low level radioactive wastes produced from the processing of rare earth recovery processes comprising mixing the waste residue with 0.1 to 50% of a fluxing agent and optionally with 0.1 to 50% silica sand, heating the mixture to a temperature in the range of about 1200° to 1800° C. to form molten glass, and pouring the molten glass into a suitable container to cool and solidify into a vitrified mass. Suitable fluxing agents include sodium hydroxide, sodium carbonate, sodium borate, sodium perborate, or mixtures thereof.

3 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR THE IMMOBILIZATION AND VOLUME REDUCTION OF LOW LEVEL RADIOACTIVE WASTES FROM THORIUM AND URANIUM PROCESSING

BACKGROUND OF THE INVENTION

1. Field of Invention

This invention relates to a process of treating radioactive waste, and more specifically to a process for the immobilization and volume reduction of low level radioactive wastes produced by Rare Earth recovery processes.

2. Description of the Prior Art

The processing of pitchblende or monazite produces low level radioactive waste residues which bear thorium, and/or uranium and their natural decay daughters. Typically, these thorium and/or uranium bearing wastes are in the form of slurries and, as such, present disposal problems due to volume and containment considerations.

Various processes are known in the prior art to concentrate and immobilize toxic and/or radioactive wastes. For example, U.S. Pat. No. 4,725,383 teaches a process for volume reduction and solidification of a radioactive waste solution by adding ZnO or a mixture of ZnO with $Al_2O_3$ and/or CaO, dehydrating the mixture, and melting to produce a vitrified solid. Another process for volume reduction and immobilization of waste is taught by U.S. Pat. No. 4,395,367 wherein fission waste is treated by mixing a glass forming agent, a metal oxide and a reducing agent with the fission waste, and heating the mixture until melted.

However, none of the known processes are effective on thorium and/or uranium bearing waste residues due to the extremely high melting point of $ThO_2$ (3200° C.) and $UO_2$ (2500° C.). Under the process of this invention, it has now been discovered that the volume of these thorium and/or uranium bearing waste residues can be reduced by as much as 60 to 80 percent and that it is possible to immobilize these wastes into a solid, vitrified mass.

SUMMARY OF THE INVENTION

It is an object of this invention to provide a process for the concentration and immobilization of radioactive waste residues.

It is another object of this invention to provide a process for vitrifying the waste residues obtained from processing pitchblende or monazite.

It is another object of this invention to provide a process for reducing the volume of radioactive waste residues and immobilizing these residues to produce a dustless environmentally safe form.

It is another object of this invention to reduce the diffusion of radon into the environment, reduce alpha and beta radiation exposures, and maintain gamma radiation exposure within reasonable limits.

Under the process of the present invention, there has been provided a method of treating the radioactive waste residues which result from the processing of pitchblende or monazite or other thorium or uranium bearing minerals, which comprises forming a mixture of a dried radioactive thorium and/or uranium containing waste residue and a fluxing agent, melting the mixture to form molten glass, and pouring the molten glass into a suitable container.

DETAILED DESCRIPTION

The present invention is directed to a process of treating the solid thorium and/or uranium containing radioactive waste obtained from the processing of monazite, pitchblende, xenotine, apatite, bastnasite or other rare-earth bearing ores. The process of this invention comprises mixing the dried waste residue with about 0.1 to 50% by weight of a fluxing agent, optionally about 0.1 to 50% by weight $SiO_2$, and heating the mixture to a molten glassy state, and pouring the molten glass into a suitable container for burial or storage.

The waste residues capable of being treated under this process are any solid radioactive waste residues which bear thorium or uranium, and their natural decay daughters. Appropriate fluxing agents for use in the invention include, but are not limited to, NaOH, $Na_2CO_3$, $NaBO_2$, $Na_2B_4O_7$ or mixtures thereof. Silica sand may also be added to the mixture if necessary. The specific proportions of fluxing agent and silica sand to be added to the mixture can vary depending on the desired melt viscosity and are not per se critical to the invention provided that adequate pour viscosities are developed in the mixture. The preferred melt viscosities of this invention are in the range 1000 to 3000 centipoise at pour temperatures of 1093° to 1260° C.

The dried radioactive waste residues, together with the fluxing agent and optionally silica sand, may be added batchwise or in a continuous process to an appropriate glass furnace. The furnace is typically heated to a temperature in the range 1200° to 1800° C., and the glass residence times in the melter are between 2 and 24 hours. Furnace temperatures and glass residence times are generally interdependent. Therefore, if a temperature higher than 1800° C. is used, a correspondingly shorter residence time will be required to achieve the desired molten glass state.

The molten glass waste residues are then poured into steel or stainless steel, or other similar containers in which the melt is cooled to form a solid, vitrified mass, whereupon the containers can be sealed by welding or other suitable method.

The final percentage of thorium and uranium present in the reduced volume vitrified waste is about 0.1 to 50% by weight and 0.01 to 10% by weight respectively.

Without further elaboration, it is believed that one skilled in the art, using the preceding detailed description can utilize the present invention to its fullest extent.

The following example is provided to illustrate the invention in accordance with the principles of this invention, but is not to be construed as limiting the invention in any way except as indicated in the appended claims. All parts and percentages are by weight unless otherwise indicated.

EXAMPLE 1

Thorium bearing radioactive waste residues in the form of a thick slurry were obtained from a monazite cracking plant. The initial density of this residue was 1.85 g/cc. The waste residues were dried, ground to a fine powder, and mixed with 20% by weight $Na_2B_4O_7$. The mixture was heated to 1540° C. for two hours to produce a molten glass that was readily pourable. The glass residue was cooled to room temperature and had a density of 4.0 g/cc. After accounting for the weight loss due to water evaporation, and weight gain from the addition of the $Na_2B_4O_7$, this represents approximately a 70% volume reduction.

What is claimed is:

1. A process for treating low level radioactive waste comprising:

(a) drying a waste residue obtained from the removal of rare-earths from a rare-earth bearing ore selected from the group consisting of monazite, pitchblende, xenotine, apatite and bastnasite to obtain a dried waste residue which contains 0.1 to 50% by weight thorium and/or 0.01 to 10% by weight uranium;

(b) mixing the dried residue with silica sand and a glass forming agent selected from the group consisting of NaOH, $Na_2CO_3$, $Na_2B_4O_7$ and $NaBO_2$ and mixtures thereof to obtain a mixture which contains 0.1 to 50% by weight of said agent;

(c) heating the mixture to a temperature of 1200° to 1800° C. to obtain a molten mass; and (d) cooling said molten mass to obtain a solid, vitrified mass having a volume 60 to 80 percent less than said waste residue.

2. The process of claim 1 wherein the sand is added in amounts ranging from 0.1 to 50 percent by weight of the total mixture.

3. A solid vitrified product prepared by the process of claim 2.

* * * * *